Jan. 21, 1936. J. T. BRUBAKER 2,028,134
MECHANISM FOR MECHANICAL MEASUREMENTS
Filed June 15, 1935 4 Sheets-Sheet 1
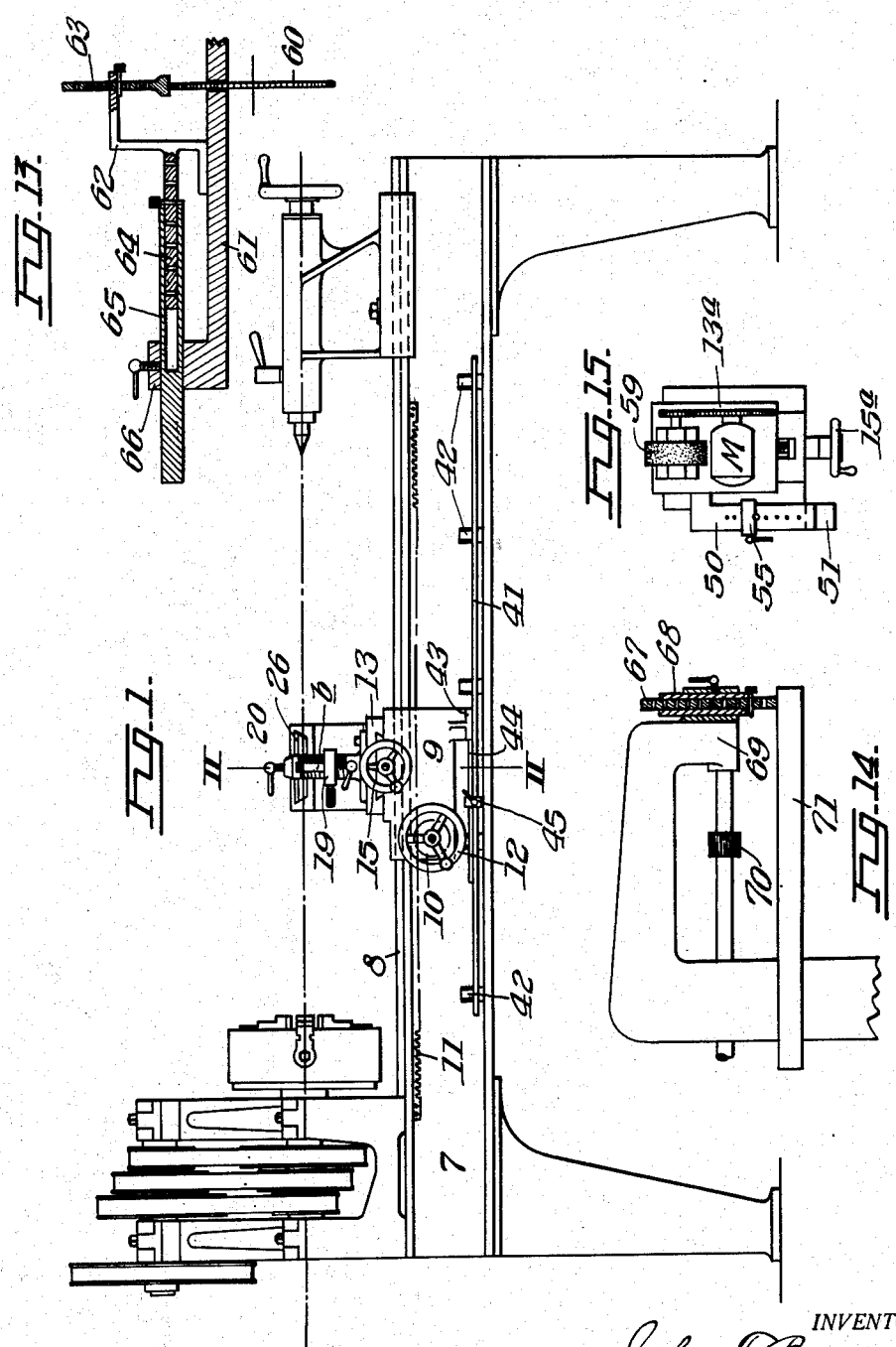
INVENTOR.
John T. Brubaker
BY
ATTORNEY

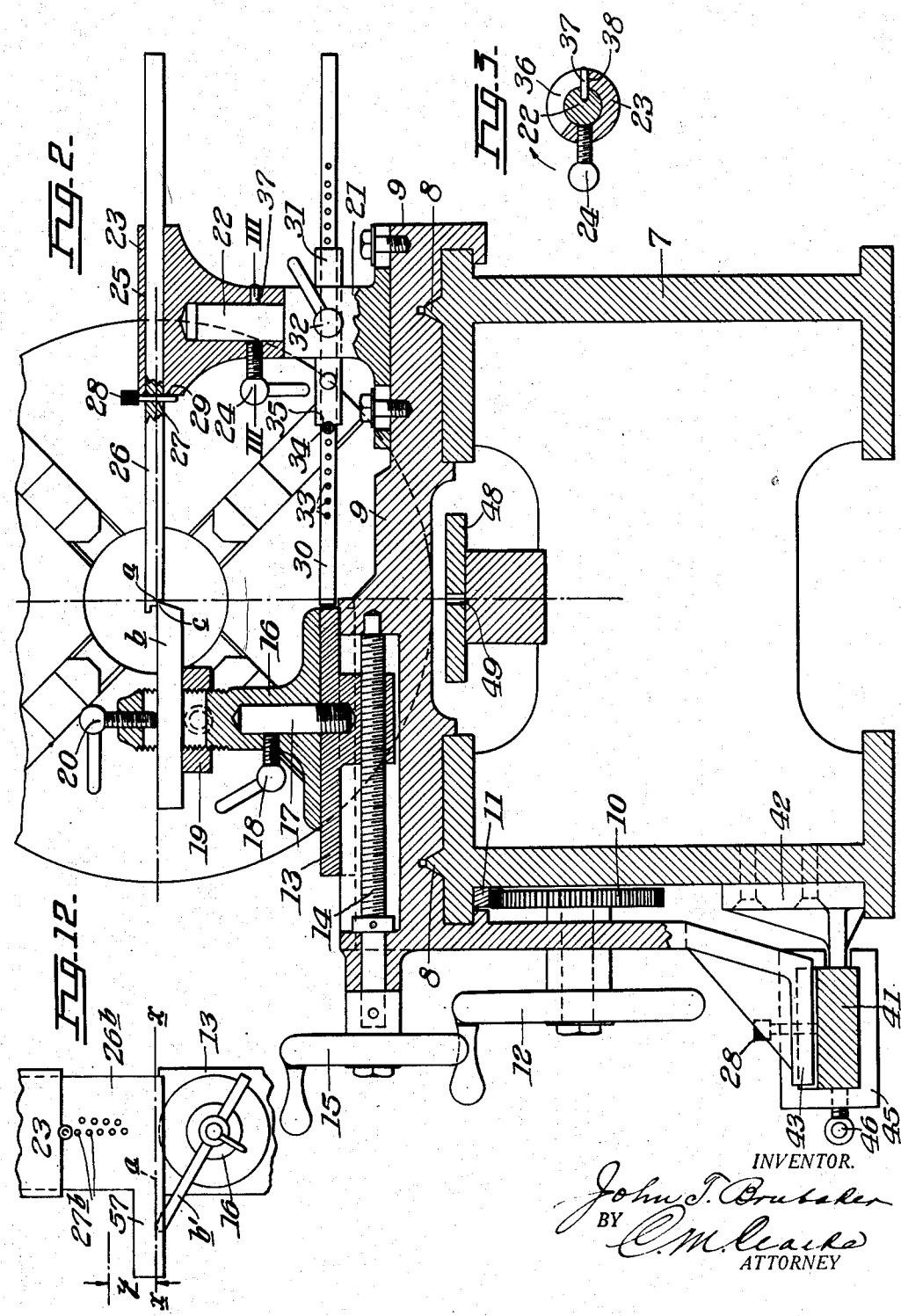

Jan. 21, 1936.  J. T. BRUBAKER  2,028,134
MECHANISM FOR MECHANICAL MEASUREMENTS
Filed June 15, 1935  4 Sheets-Sheet 3
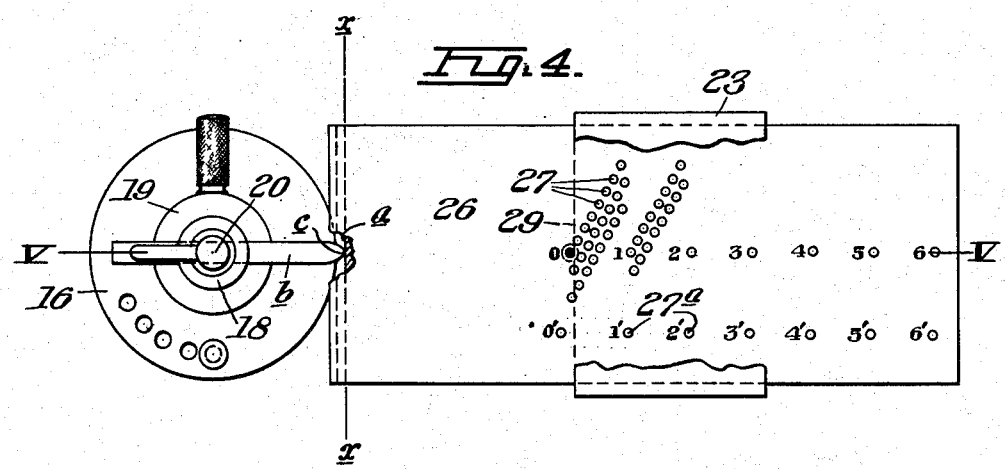
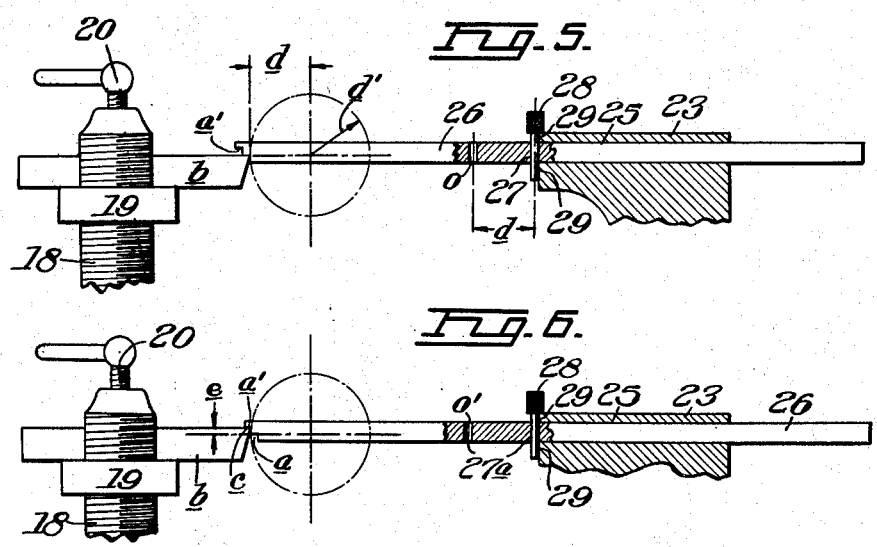
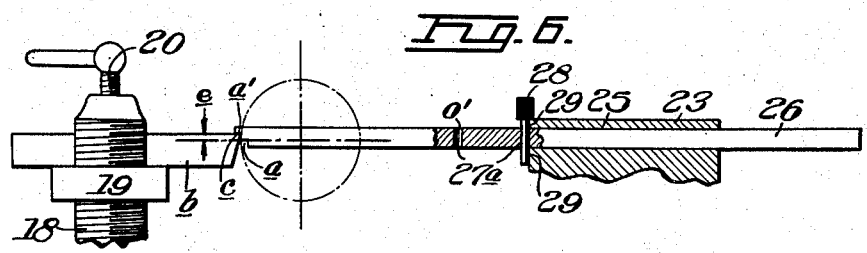
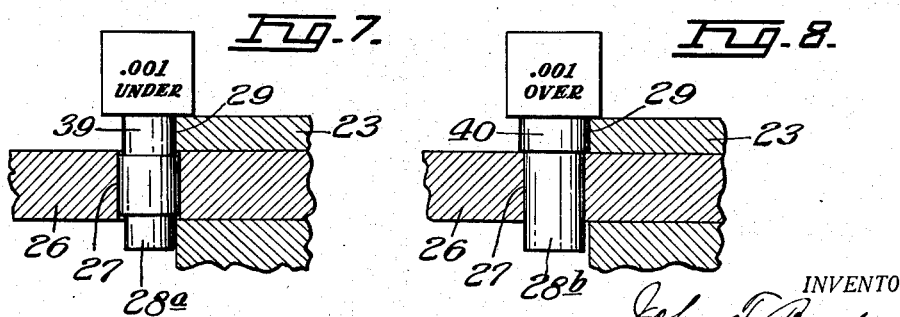
INVENTOR.
John T. Brubaker
BY
ATTORNEY.

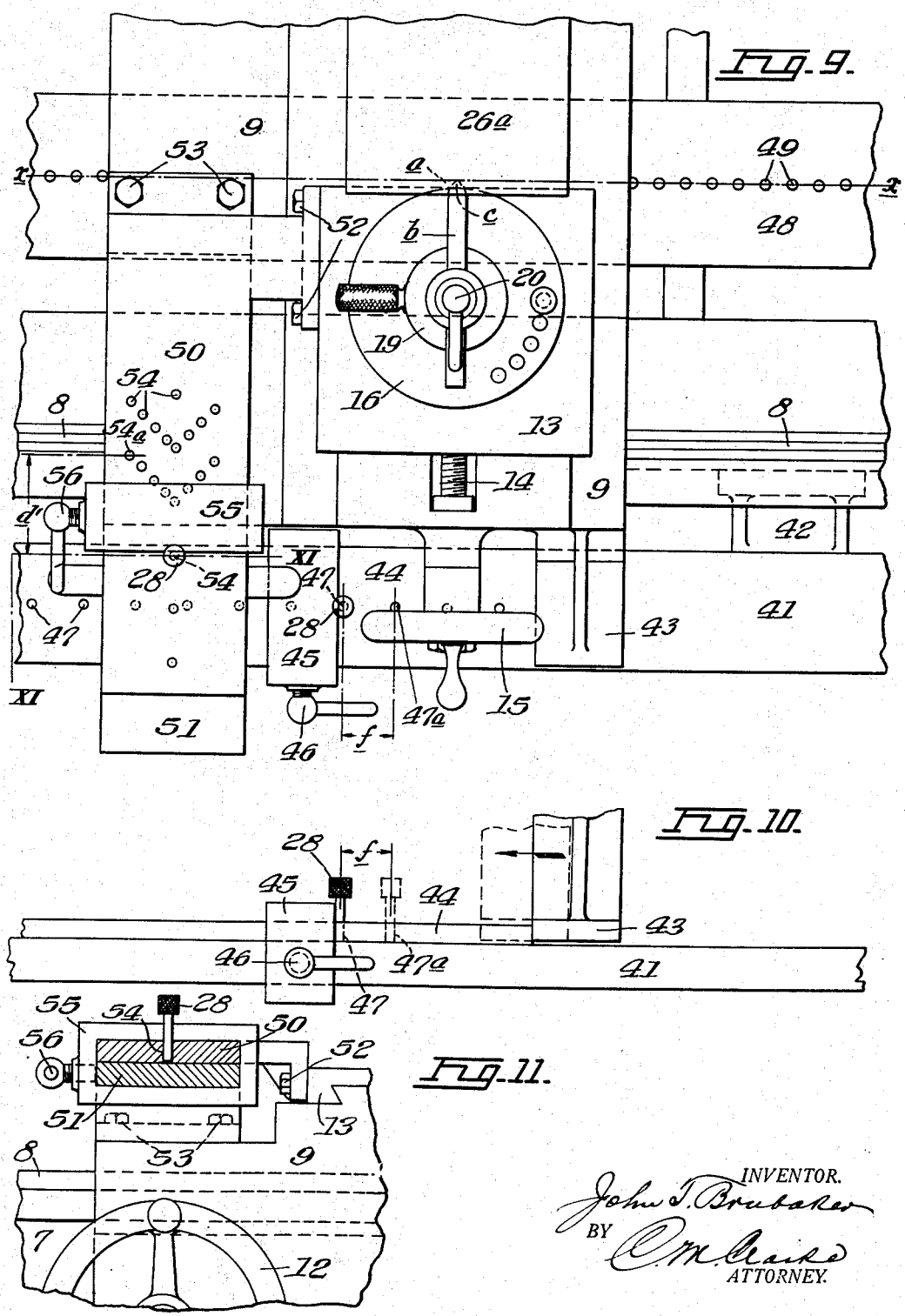

Patented Jan. 21, 1936

2,028,134

UNITED STATES PATENT OFFICE 2,028,134

MECHANISM FOR MECHANICAL MEASUREMENTS

John T. Brubaker, Wilkinsburg, Pa.

Application June 15, 1935, Serial No. 26,880

20 Claims. (Cl. 82—34)

This invention relates to improvements in the art of mechanical measurements, particularly in connection with machine tools and their operation.

My invention contemplates utilizing one or more fixed points of reference, and accurately determining the desired finished dimensions or measurements of the work, by relating the movements or travel of an applied tool to said reference points.

For example, in connection with a lathe, I employ means coincident with the turning center of the work, and by associated graduated means, fix and limit the cutting depth of the tool with reference to said center. Likewise, the length of cut may be similarly related by means of my invention to an end or other reference point on the work itself.

Generally stated, the principle of the invention is utilized by means of an abutment gauge or equivalent means for determining terminal limits of measurement in connection with an adjustable cutting tool to position.

Such means as employed are accurate and positive in their operation, and eliminate the usual "cut and try" methods now in use, and involving micrometer and other calipers and measuring devices, and the ordinary visual and manipulative functions.

Additional objects and advantages will become apparent from the following description taken in connection with the accompanying drawings, wherein:

Fig. 1 is an elevational view of a conventional machine lathe, showing my invention applied thereto;

Fig. 2 is an enlarged sectional view taken on the line II—II of Fig. 1;

Fig. 3 is a detail section taken on the line III—III of Fig. 2;

Fig. 4 is a plan view of the lathe tool and the measuring device of my invention;

Fig. 5 is a sectional view taken on the line V—V of Fig. 4;

Fig. 6 is a view similar to Fig. 5, showing a second position of the lathe tool;

Figs. 7 and 8 are enlarged detail views of a portion of Fig. 5, showing means for obtaining micrometer measurements by means of my invention;

Fig. 9 is an enlarged top plan view of the lathe carriage and a portion of the bed, showing the measuring means in connection with the movement of the carriage;

Fig. 10 is an elevational view of the said means;

Fig. 11 is a part elevational and part sectional view, said section being taken on the line XI—XI of Fig. 9;

Fig. 12 is a plan view of a modified form of means for obtaining measurements for internal cutting or boring;

Fig. 13 is a diagrammatic view showing the application of my invention to a circular saw, jointer, or the like;

Fig. 14 is a similar view of the application to a milling machine; and

Fig. 15 is a diagrammatic plan view of a grinding attachment for the lathe carriage to which my invention is applied.

In the drawings, I have illustrated an embodiment of my invention as applied to a machine lathe, it being understood that the invention is not to be limited thereto, as the same may be efficiently employed with other machine tools and the like.

Referring to the drawings, the lathe shown has a bed 7 provided with ways 8 upon which a carriage 9 is movably mounted as by means of a gear 10 in mesh with a toothed rack 11 on the bed, and rotatable by a hand wheel 12.

13 designates a tool rest on the carriage 9 in threaded engagement with a screw 14, the latter having a hand wheel 15 for moving the rest transversely of the bed 7. A vertical tool post 16 is pivotally mounted on a stud 17 of the rest 13, and a clamping screw 18 secures the post 16 on said rest.

The upper portion of the post 16 is slotted in the usual manner to receive a tool or bit b, and is externally threaded to receive an annular bit elevator 19, between which elevator and a set screw 20 the said bit b is adjustably secured.

Also mounted on the carriage 9, I provide means for co-operation with the tool or bit b, including a post or standard 21 having a vertical stud 22 upon which a measuring head 23 is pivoted, the same being selectively secured on the stud by a clamping screw 24.

Slidably mounted in a suitable opening 25 of said head 23 is a horizontal flat measuring slide 26, said member being provided at its inwardly extending end with a transverse shouldered groove $a$ adapted to be engaged by the cutting edge or lip $c$ of the tool $b$. Suitable measuring means or graduations are provided on the slide 26 co-acting with the head 23 for measuring the work, said means including a series of locating positions or stations, as openings 27. These are spaced longitudinally of the slide in accordance with a standard system or sequence of graduations, as for example, sixty-fourths of an inch, measured from an initial opening indicated 0 in Fig. 4, toward the outer end of the slide.

A stop or index pin 28 is provided for insertion in one of the openings 27 and is designed for engagement with a transverse abutment 29 of the head 23 when so positioned. Upon inserting said pin in the opening 0 and moving the slide 26 backwardly until said pin contacts the abutment 29, the groove $a$ on the inner end of the slide will coincide with the turning center $x$—$x$ of the lathe as shown.

Said groove $a$ is preferably of right angular form, having meeting vertical and horizontal faces so that when their juncture is coincided with the center $x$—$x$ as stated, the tool or bit elevator 19 and the tool rest 13 may be adjusted to properly enter the bit edge $c$ in said groove for center or neutral position.

Having registered the center $x$—$x$ with the cutting lip of the bit, the tool rest is retracted by rotation of the hand wheel 15, and the measuring slide 26 advanced toward the bit a distance $d$, from the center to the peripheral cutting zone, measured by inserting the pin 28 in the desired opening 27. By advancing the bit against the groove $a$ until the inserted pin contacts abutment 29 as in Fig. 5, the said bit will be in proper position to cut the desired circular cut having a corresponding radius $d'$ as indicated.

It being necessary to displace the slide 26 and retract the bit $b$ for entrance of the work in the lathe, I prefer to employ a graduated stop 30, illustrated in Fig. 2, said stop being slidable horizontally within a hollow sleeve 31, the latter also being slidable within the standard 21 and selectively secured therein by a clamping screw 32.

The stop 30 is provided with a graduated series of transverse openings 33 for receiving an index pin 34, which pin is designed to abut and cooperate with the end 35 of the sleeve 31.

In order to retain the measurement $d$, with the tool rest 13 in the position locating the same by the slide 26, the stop 30 is advanced into contact with the tool rest, and the pin 34 placed in a convenient opening 33 whereby the loosened sleeve 31 may be advanced to abut said pin by its end 35, in which position the sleeve is locked by the screw 32.

Thus, having limited the inward or centerward travel of the rest and therefore the bit $b$ to a distance $d$ from the turning center of the lathe, the bit may be retracted and the head 23 and its slide 26 pivotally swung out of the center portion of the lathe for entrance of the work. The tool may then be advanced into the work until the rest contacts said stop 30. It will thus be seen that the stop member 30 may be used to determine the inner and outer positions of the tool rest and corresponding neutral and cutting positions of the tool.

In order to always return the head and slide to a position such that the groove $a$ of said slide will be disposed in parallelism with the center $x$—$x$ of the lathe, the portion of said head pivotally bearing on its stud 22 is slotted as at 36 in Fig. 3, for receiving a pin 37 fixed in said stud and engaging an end 38 of the slot to accurately determine the correct position of the head for measuring purposes.

Having once located the center of the lathe, and therefore the center of the work, various settings of the tool or bit may be obtained by varying the location of the pin 34 in the graduated openings of stop 30, thereby producing cuts of the various depths required.

The foregoing measurements or settings of the tool or bit are made to attack the work in the horizontal plane of the turning center $x$—$x$, and such settings will be found satisfactory for many metals and materials. However, efficient cutting or turning of certain metals, requires that the bit attack the same slightly above the said plane.

For this purpose, I have shown in Fig. 4, a secondary scale or graduation of openings 27a in the slide 26, which openings are graduated in accordance with the difference or increment resulting from elevating the bit $b$ a distance $e$ in Fig. 6 above said normal horizontal plane, as determined by a second upper groove $a'$ in the said slide.

In other words, when it is desired to cut at the increased elevation, the cutting edge of the bit or tool must necessarily be advanced inwardly of the work a slight distance, the amount thereof varying with the radius of the circular cut desired. Hence, the openings 27a including the centering openings 0', are accurately spaced and related with the bit-receiving groove $a'$ and the abutment 29 of the measuring head for operation as before.

For fine measurements or tolerances, as for example, plus or minus one-thousandth of an inch, the pins 28 and 34 may be provided with accurately ground portions co-operating with their respective abutments 29 and 35, to proportionately vary the location of the measuring means. Figs. 7 and 8 illustrate such pins, emphasized, for use with the slide 26, the pin 28a having a reduced or undercut section 39 for engagement with the abutment 29 to obtain a minus measurement under that which would be obtained by employing the straight pin 28, and 28b having an enlarged section 40 for similarly effecting a plus measurement.

Means are employed in connection with the lathe carriage 9 for measuring the length of a cut longitudinally of the work, by relating the travel of the carriage to a reference point on the work.

A longitudinally extending rail 41, (Figs. 9 and 10) is secured to the lathe bed 7 by suitable brackets 42, over which an abutment 43 on the lathe carriage travels by movement of said carriage. A calibrated slide 44 is carried by the rail, said slide and rail mounting an embracing collar 45 having a locking screw 46 for selectively securing the same to said rail.

Upon moving the carriage and locating the tool or bit $b$ upon a predetermined reference point on the work, the slide 44 is moved along the rail 41 into contact by an end thereof with the carriage abutment 43, as clearly shown in Fig. 10. An index pin 28 is inserted in an available graduated opening 47 in the slide, and the collar 45 moved into contact with said pin, where it is secured to the rail by its screw 46.

It is general practice in lathe operations to cut toward the left or head end, and hence the slide will be located on the left side of the carriage abutment, and the collar will engage on the left side of the pin 28.

By measuring the desired distance of the cut on the slide 44, as by moving pin 28 toward the right, to a second opening 47a, as for example, a distance $f$, the length of cut will be equal to such distance, the travel of the carriage moving the slide until the pin contacts the fixed collar 45 to limit the cut. Repeated settings and cuts may be similarly made which are related to or measured from a single point on the work.

A modified form of means for measuring the length of cut may be provided in the form of a longitudinally extending plate 48 disposed centrally of the lathe bed and having graduated pin-receiving openings 49 therein for receiving index pins to project into the path of the carriage 9, as will be readily understood.

A further modification is shown in Figs. 9 and 11 for measuring the depth of cut of the tool or bit b, comprising a pair of members 50 and 51, the member or slide 50 being secured to the tool rest 13 as at 52, and the member 51 being mounted on the carriage proper 9 as at 53 for movement therewith, both of the members including extended overlying portions disposed in the direction of travel of the tool rest 13.

The upper slide member 50 is provided with graduated openings 54 to receive an index pin 28 cooperating with a collar 55 embracing and slidable on the members 50 and 51, being adapted to be locked to the member 51 as by a locking screw 56.

Having centered the bit b in the groove a of a slide 26a as before, and as illustrated in Fig. 9, a pin 28 is placed in a convenient opening 54 in the slide 50, and the collar 55 is moved to contact said pin, in which position the collar is locked to the member 51 by its screw 56. The desired radius d' of the cut to be made on the work is then determined by retracting the tool rest 13 by its hand wheel 15, thereby moving the slide 50 relatively to the member 51 and collar 55, until the desired distance may be obtained by moving pin 28 to a second opening 54a of the slide 50, which location will then accurately limit the return movement or advance of the bit by engagement of the pin with the collar 55.

A still further modification is shown in Fig. 12, wherein the slide 26b mounted in the head 23 is provided with an extended square portion or arm 57 extending the centering groove a for the purpose of contacting the angularly disposed bit or tool b' in setting up for internal cutting or boring. In this instance the calibrated openings 27b extend along the slide 26b in the opposite direction from the openings 27 previously described, whereby to measure a radius y by advancing the bit beyond the center of turning x—x in the usual position for boring.

By means of my invention, the desired measurements or dimensions of a piece of work may be accurately and easily determined by setting or relating the tool as hereinbefore described. The measuring means of my device, when constructed with a high degree of accuracy, will continuously effect accurate measurement without repeated scaling, micrometer gauging, or checking with additional measuring instruments as is now necessary in general practice.

Fig. 15 illustrates the application of my measuring means to a grinding tool 59 mounted with its motor M on a rest 13a, movable on the lathe carriage by a hand wheel 15a, and including the measuring arms 50 and 51 with collar 55 as before.

Grinding operations are generally employed upon preformed work, and hence measurements for positioning and limiting the grinding wheel 59 are determined from the exterior surface of the work, the wheel being moved into contact with said surface and the means 50—51—55, together with the provided openings and index pin, and manipulated in the manner described for obtaining the desired dimension on the finished work.

My invention has further application to other devices and machine tools, for example, in Fig. 13, I show the same in connection with a circular saw or jointer, in which the rotating saw or knife 60 is movable vertically with respect to the table 61 in any suitable and well known manner. An overhead bracket 62 carries a vertical measuring slide 63 having pin-receiving openings graduated to measure the height of tool with reference to the table surface, and therefore with reference to a face or surface of the work to be moved across said surface.

For locating the cut to be made with reference to a second surface of the work, the bracket is connected and movable with a second measuring slide 64 having graduated pin-receiving openings for coaction with a receiving sleeve 65 selectively locked in a bearing post 66.

Similarly, the milling machine of Fig. 14, may be provided with a graduated slide 67 and a sleeve 68 selectively secured in the head 69 of the machine, for relating the cutting circumference of the milling cutter 70 to the surface of the vertically movable table 71, and therefore to a face or surface of the work to be milled.

The principle of the invention and its application to different conditions arising in the use of various metal reducing machines will be readily understood and appreciated by mechanics or machinists familiar with the necessity for easy and accurate adjustment of such machines.

Thus assuming any two points to define an arbitrary distance of measurement with relation to which adjustment is to be made, such adjusted distance may be very accurately determined, either by addition or subtraction to or from such arbitrary or initial distance, by use of my invention.

By my improvement the extreme accuracy of abutment gauging and positive location of the cutting tool by the means utilized, effects the exact desired results, eliminating the possibility of guessing, slight mistakes and re-treatment. It is equally applicable to external or internal cutting tool adjustment in turning lathe operations, or planing or milling in flat work, or where the areas to be treated are concealed or not easily accessible.

At the same time the use of the usual measuring implements or gauges or other commonly used accessory instruments is avoided, and proper setting of the tool enables the operator to start and finish the work with resulting extreme accuracy.

Various applications of the invention may be utilized in connection with other machines or operations than those described and illustrated, and changes in detail construction or otherwise may be made by the skilled mechanic, within the scope of the following claims.

What I claim is:—

1. In a machine tool, the combination with a cutting element and means for locating it at a neutral position and a cutting position, of a slidable member having a series of selectively usable stop elements providing a limiting abutment for the locating means at both positions.

2. In a machine tool, the combination with a cutting element and means for locating it at a neutral position and a cutting position, of a slidable member having a series of selectively usable stop elements providing a limiting abutment for the cutting element at both positions.

3. In a machine tool, the combination with a cutting element and means for locating it at a neutral position and a cutting position, of a slidable member having a series of selectively usable stop elements embodying a series of locating stations and providing a limiting abutment for the cutting element locating means at both positions.

4. In a machine tool, the combination with a cutting element and means for locating it at a neutral position and a cutting position, of a slidable member having a series of selectively usable stop elements embodying a series of locating stations and providing a limiting abutment for the cutting element at both positions.

5. In a machine tool, the combination with a cutting element and means for locating it at a neutral position and a cutting position, of a limiting abutment gauge for interfering engagement with the locating means of the cutting element having a series of fixed positioning means.

6. In a machine tool, the combination with a cutting element and means for locating it at a neutral position and a cutting position, of a limiting abutment gauge for interfering engagement with the cutting element having a series of fixed positioning means.

7. In a machine tool, the combination with a cutting element and means for locating it at a neutral position and a cutting position, of a limiting abutment gauge for interfering engagement with the locating means of the cutting element consisting of a support and a movable abutment gauge thereon, and a plurality of fixed positioning means on the abutment gauge for locating it at varying positions.

8. In a machine tool, the combination with a cutting element and means for locating it at a neutral position and a cutting position, of a limiting abutment gauge for interfering engagement with the cutting element consisting of a support and a movable abutment thereon, and a plurality of fixed positioning means co-operable with the support for locating the abutment at varying positions thereon.

9. In a machine tool, the combination with a cutter and a carriage therefor having adjusting means, an oppositely located support, and a reciprocable abutment therein engageable with the cutter carriage at varying positions provided with a lengthwise series of fixed positioning means.

10. In a machine tool, the combination with a cutter and a carriage therefor having adjusting means, an oppositely located support, a movable abutment therein engageable with the cutter carriage at varying positions, and a plurality of fixed positioning means co-operable with the support for locating the abutment in its support at varying positions to determine corresponding positions of the cutter.

11. In a machine tool, the combination with a cutter and a carriage therefor having adjusting means, an oppositely located support, a movable abutment therein engageable with the cutter at varying positions and having a series of limiting stop devices cooperable with the support for locating the abutment in its support at varying positions to determine corresponding positions of the cutter.

12. In a machine tool, the combination with a terminal element, of a support and a movable abutment thereon adapted to be located in interfering relation to said element, and means embodying selective stop devices co-operating with the support for locating the abutment at varying positions to determine corresponding positions of the terminal element.

13. In a machine tool, the combination with a terminal element, of a movable abutment adapted to be located in interfering relation thereto, a support therefor, and means embodying selective stop devices co-operating with the support for locating the abutment in its support at varying positions to determine corresponding positions of the terminal element.

14. In a machine tool, the combination with a terminal element, of a support, a movable abutment on said support positioned at a spaced distance from said element, and means embodying a series of selective stop devices for locating the abutment at a predetermined position with relation to the terminal element and at an adjusted position with relation to said spaced distance.

15. In a machine tool or the like adapted for shaping work, the combination with a tool for application to the work, of means adjustably relating the tool and work including a slidable abutment determining a fixed point of reference to the work, whereby the tool may be coincided therewith, and graduated means on the abutment for gauging successive positions of the tool with respect to said fixed point, as and for the purpose described.

16. The combination with a movable tool element, of a movable measuring slide engageable therewith having graduations thereon, a stationary bearing head mounting the slide and having a transverse abutment, and an index pin movable with the slide into contact with said abutment for measuring and limiting the movement of the tool element.

17. The combination with a movable tool element, of a movable slide having graduations thereon, an adjustable member having an abutment transversely of the slide, and an index pin movable with the slide into contact with said adjustable member for measuring and limiting the movement of the tool element.

18. In a lathe or the like, the combination with abutment means locating the turning center thereof, of a tool adapted to engage said abutment, and a slidable graduated measuring abutment means for relating the travel of the tool to said turning center.

19. In a lathe or the like, the combination with abutment means locating the turning center thereof, of a movable carriage, a tool rest on the carriage for moving a cutting tool toward and away from said center, graduated measuring means for gauging the position of the tool relatively to said center, longitudinally extending means for measuring the travel of the carriage, said means including a graduated slide, a stationary member upon which said slide is movable, a movable collar adapted to be selectively secured to said stationary member, said carriage having an abutment for cooperation with the slide, and said slide having a pin for engaging said collar.

20. Measuring means comprising a pair of relatively movable members, one of said members having graduated stop device measuring means, and a movable element adapted to be selectively secured to one of said members and coacting with the measuring means for limiting the relative movement of said members.

JOHN T. BRUBAKER.